United States Patent [19]

Dix

[11] Patent Number: 4,465,808

[45] Date of Patent: Aug. 14, 1984

[54] POLYESTER/CARBOXY-RUBBER MOLDING COMPOSITION CONTAINING POTASSIUM UNSATURATED-HYDROCARBYL ORTHOPHOSPHATE

[75] Inventor: James S. Dix, Bartlesville, Okla.

[73] Assignee: Phillips Petroleum Company, Bartlesville, Okla.

[21] Appl. No.: 507,402

[22] Filed: Jun. 24, 1983

[51] Int. Cl.$^3$ .................... C08L 67/06; C08K 5/05; C08K 5/52

[52] U.S. Cl. .................... 525/170; 523/506; 523/511; 523/514; 523/523; 523/526; 523/527; 525/171

[58] Field of Search .............. 525/170, 171; 523/526, 523/523, 511, 514, 527, 506

[56] References Cited

U.S. PATENT DOCUMENTS

| | | | |
|---|---|---|---|
| 3,050,487 | 8/1962 | Solomon | 524/121 |
| 3,051,695 | 8/1962 | Warner et al. | 528/387 |
| 3,135,716 | 6/1964 | Uraneck et al. | 525/122 |
| 3,242,129 | 3/1966 | Wilder | 524/483 |
| 3,432,472 | 3/1969 | Caldwell | 260/758 |
| 3,776,806 | 12/1973 | Mayer et al. | 524/538 |
| 4,020,036 | 4/1977 | South | 523/514 |
| 4,158,654 | 6/1979 | Moczygemba et al. | 525/171 |
| 4,172,059 | 10/1979 | Atkins et al. | 523/514 |
| 4,287,313 | 9/1981 | Uber et al. | 525/91 |
| 4,322,334 | 3/1982 | Arakawa et al. | 525/171 |
| 4,329,438 | 5/1982 | Yamori et al. | 525/64 |
| 4,400,478 | 8/1983 | Gergen et al. | 523/514 |

OTHER PUBLICATIONS

Allport et al., *Block Copolymers* (Wiley 1973), pp. 264–265.

*Primary Examiner*—Herbert J. Lilling
*Attorney, Agent, or Firm*—Lyell H. Carver

[57] ABSTRACT

A thermosetting molding composition containing unsaturated polyester and carboxy-containing rubber exhibit improved surface gloss of molded articles when the composition further contains an unsaturated ester/-potassium salt of phosphoric acid, such as potassium oleyl phosphate.

17 Claims, No Drawings

POLYESTER/CARBOXY-RUBBER MOLDING COMPOSITION CONTAINING POTASSIUM UNSATURATED-HYDROCARBYL ORTHOPHOSPHATE

FIELD OF THE INVENTION

The invention pertains to polyester/carboxy-rubber thermosetting compositions. In another aspect, the invention pertains to curable thermosetting compositions containing a polyester and carboxy-rubber. In a further aspect, the invention pertains to cured thermosetting compositions of polyesters and carboxy-rubbers. In a still further aspect, the invention pertains to articles made of cured thermosetting compositions of polyesters and carboxy-rubbers.

BACKGROUND OF THE INVENTION

Polyesters, particularly unsaturated polyesters, present attractive prospects as substitutes for metal parts in many applications, such as automotive grills and other decorative pieces. Polyesters offer basically good molding characteristics, economy, and lightweight, though they have lacked adequate impact strength, particularly when combined with reinforcing agents and/or fillers.

Improvements in use of unsaturated polyester compositions have been attempted by incorporating rubbers into the composition. Various liquid, semi-solid, or solid rubbers have been mixed with polyesters to produce thermosetting compositions with better impact strength. However, rubbers generally have not been compatible with polyesters, resulting in non-uniform mixtures, and sometimes delamination has occurred.

Problems with compatibility have been substantially solved by the incorporation with the unsaturated polyester of rubbery carboxy-polymers of conjugated dienes into a composition further containing a vinyl monomer, usually further with a reinforcing agent and/or filler. The carboxy-containing rubbery polymers have proven highly compatible with the unsaturated polyester, mix well, and result in compositions (compounds) for both bulk molding (BMC) and sheet molding (SMC) which provide uniformity, avoid delamination, and exhibit improved pigmentability while yet retaining good physical properties including good impact strength. The carboxy-terminated rubbery polymers also act as modifiers which reduce mold shrinkage frequently attendant to polyester molding.

Still, a continuing recognized problem in compression molded thermoset polyester parts, from both bulk molding compounds (BMC) and from sheet molding compounds (SMC), is that the surface appearance and smoothness of the parts simply are not anywhere equivalent to or equal to that obtainable from metal. This general problem of deficient surface appearance also is true of plaques molded from glass-reinforced polyester compositions containing a carboxy-terminated rubber as modifier.

Needed is a polyester molding composition of good strength, moldability, and lightweight, as demanded in many applications for metal substitution, but which exhibits the good surface "look" to which the customer is accustomed.

BRIEF DESCRIPTION OF THE INVENTION

I have discovered that the inclusion of a small effective amount of potassium unsaturated-hydrocarbyl orthophosphate to the molding composition comprising an unsaturated polyester, a vinyl monomer, and a carboxy-containing rubber, distinctly improves the surface gloss of the molded articles.

Without the additive of my invention, the thermosetting molding compositions, both sheet molding compositions and bulk molding compositions, are deficient in surface gloss, particularly in areas of the molded part which were adjacent to the inlet where the fluid compositions enter the mold.

My compositions contain unsaturated polyester, carboxy-rubber, vinyl monomer, and the potassium unsaturated-hydrocarbyl orthophosphate additive as the primary ingredients. For a curable thermosetting composition, a catalyst, of course, is included. Optional further ingredients include fillers, reinforcing agents, lubricants, stabilizers, colorants or pigments, and the like.

My compositions including the potassium unsaturated ester phosphate additive in the polyester/carboxy-rubber curable thermosetting compositions provide molded products with higher surface gloss than otherwise heretofore feasible, and also result in higher surface gloss than similar compositions containing additives other than that in accordance with my invention.

DETAILED DESCRIPTION OF THE INVENTION

Potassium Unsaturated-Hydrocarbyl Orthophosphate

The potassium salt/unsaturated hydrocarbyl esters of orthophosphoric acid additives broadly can be represented by:

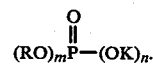

$$(RO)_m\overset{O}{\underset{\|}{P}}-(OK)_n.$$

In the above formula, each R is hydrogen or an unsaturated hydrocarbyl radical, such that at least one R must be the aforesaid unsaturated hydrocarbyl radical; m is an integer and is 1 or 2; n is an integer and is 1 or 2; m plus n is 3; and K is potassium. The unsaturated hydrocarbyl radicals R are long-chained hydrocarbyl groups containing one or more double bonds, preferably of 8 to 30, more preferably 14 to 24, carbon atoms per R group.

The presently preferred salts are potassium hydrogen oleyl phosphate, dipotassium oleyl phosphate, potassium dioleyl phosphate, or mixtures. A suitable commercially available material referred to as potassium oleyl phosphate is a mixture of about 2 parts of potassium hydrogen oleyl phosphate and 1 part dioleyl potassium phosphate.

Other potassium unsaturated-hydrocarbyl orthophosphate additives useful in accordance with my invention have unsaturated hydrocarbyl groups such as 2-octenyl, 4-decenyl, 6-dodecenyl, 8-hexadecenyl, 11-nonadecenyl, 10-eicosenyl, 11-docosenyl, 12-tetracosenyl, 15-triacontenyl, and the like.

Polyesters

The polyesters employed in the compositions of my invention should be (a) unsaturated and (b) soluble in the monovinyl monomer; in general, unsaturated polyesters are soluble in monovinyl monomers.

Polyesters and their preparations are described in such as the *Condensed Chemical Dictionary*, 7th Ed., Rose and Rose (Reinhold, New York, 1966) pages 750-759; and in more detail in *Block Copolymers* by Allport and Janes (John Wiley, 1973) pages 264 and following. Polyesters can be prepared by various esterification procedures, alcoholysis, acidolysis, ester-ester interchange, or reaction of acid chloride with alcohol, as described in various publications. Primary preparation commercially is by esterification reaction of a polyol with a polyacid.

Suitable unsaturated polyesters can be prepared by reacting an olefinically unsaturated dicarboxylic acid having 4 to 12 carbon atoms, such as maleic, fumaric, itaconic, citraconic, mesaconic (or anhydrides or acid halides thereof), cis-2-dodecenedioic acid, and mixtures thereof, with one or more polyols. Representative useful polyols having at least two hydroxy groups that include such as alkylene glycols having 2 to 10 carbon atoms, dialkylene glycols having 4 to 18 carbon atoms, glycerol, pentaerythritol, trimethylolpropane, trimethylpentanediol, trimethylpropanediol, and hydrogenated bisphenol-A.

Up to about one-half or more on a molar ratio of the olefinically unsaturated diacid can be replaced by one or more saturated polycarboxylic acids or aromatic polycarboxylic acid having 2 to 12 carbon atoms so as to modify the degree of unsaturation and reactivity of the resulting polyester. Typical of these are oxalic acid, malonic acid, succinic acid, methylsuccinic acid, glutaric acid, adipic acid, suberic acid, sebacic acid, the phthalic acids, naphthalene dicarboxylic acid, cyclohexane dicarboxylic acid, citric acid, and the like, and mixtures thereof.

The proportion of polyhydric alcohols having more than two hydroxy groups, such as glycerol, and pentaerythritol, and the proportion of polycarboxylic acid having more than two carboxy groups, such as citric acid, preferably is less than about 5 mole percent each, based on total amount of polyol and polycarboxylic acid respectively, so that a polyester is obtained with maximum esterification of the hydroxy and carboxy groups without being so viscous that difficulty would be experienced during subsequent compounding.

Carboxy-containing Polymers

Suitable carboxy-containing polymers are the solid rubbery carboxy-containing diene polymers. These can contain carboxy groups at one end of the polymeric chain, or on multiple ends thereof. Included are homopolymers and copolymers of conjugated dienes, and copolymers of dienes with other copolymerizable vinyl-group-containing monomers, such as monovinylarenes, so long as sufficient copolymerized diene is present to result in a rubbery copolymer.

Suitable conjugated dienes are the hydrocarbon conjugated dienes used alone or in admixture, generally those of 4 to 12, more usually 4 to 8 carbon atoms, per molecule commercially, including such as 1,3-butadiene, isoprene, 2,3-dimethyl-1,3-butadiene, piperylene, 3-butyl-1,3-octadiene, and the like, including mixtures.

The dienes can be copolymerized with one or more monovinylarene hydrocarbons, either by admixture, or in sequential addition procedures. Among the suitable monovinylarenes are those of 8 to 18 carbon atoms per molecule, such as the presently preferred styrene, as well as 3-methyl styrene, 4-n-propyl styrene, 4-cyclohexyl styrene, 4-decyl styrene, 2-ethyl-4-benzyl styrene, 4-p-tolyl styrene, monovinyl naphthalenes, and the like, alone or in admixture.

The mode of addition in the polymerization of the diene monomer can be cis, trans, or vinyl, and can vary widely as to proportions thereof. Microstructure generally will be in the range of about 5 to 76 percent vinyl, 5 to 60 percent trans, and 15 to 50 percent cis unsaturation.

Most carboxy-terminated rubbery diene polymers are produced by treating polymer-alkali metal in hydrocarbon solution with $CO_2$ with mixing to provide a polymer

alkali metal group; the alkali metal is then eliminated by water during recovery such as steam-stripping. The resulting polymers generally have a carboxyl content in the range of about 0.01 to 5 weight percent. U.S. Pat. No. 3,242,129, col. 9 line 13, describes a method for the determination of carboxyl content.

The polymers of conjugated dienes for use in this invention are normally solid, and generally have a weight average molecular weight $M_w$ of about 30,000 to 400,000 or higher, preferably 50,000 to 250,000. In terms of inherent viscosity I.V., the ranges encompassed are about 0.4 to 3, more preferably about 0.6 to 2, determined using 0.1 gram per 100 ml of toluene at 25° C.

Carboxy-terminated polymers prepared by $CO_2$-termination are discussed in patents such as U.S. Pat. No. 3,135,716 describing dicarboxy polymers, and in U.S. Pat. No. 3,242,129 describing both mono- and polycarboxy-terminated polymers.

More recently developed carboxy-polymers and processes of preparation also are useful. These processes contact a polymer-alkali metal in solution in hydrocarbon solvent with an epoxy compound (oxirane compound) to convert the polymer-alkali metal to a polymer oxy-metal intermediate product. The thus-formed intermediate product, still in hydrocarbon solution, is thereafter contacted with a cyclic acid anhydride to produce a polymer composition having a carboxylate salt group present on the polymer chain. The polymers having the carboxylate salt group are then hydrolyzed with water to provide carboxy-containing polymers useful in the thermosetting resin compositions.

Epoxy compounds employed typically are such as the preferred ethylene oxide (oxirane), and propylene oxide, as well as 1,2-epoxybutane, 1,2-epoxypentane, 1,2-epoxy-3-methylbutane, 2,3-epoxy-3-methylbutane, 1,2-epoxy-2,4,4-trimethylpentane, 1,2-epoxycyclohexane, 1,2-epoxycyclooctane, 1,2-epoxy-4-cyclohexylpentane, 1,2-epoxyoctadecane, 1,2-epoxyeicosane, styrene oxide, 1,2-epoxytriacontane, 1,2-epoxy-2-cyclohexylbutane, 3,4-epoxy-3,4-diethylhexane, 1,2-epoxy-2-(para-tolyl)butane, 2,3-epoxy-3-methyl-2-benzylpentane, and the like, alone or in admixture.

The cyclic acid anhydrides employed should be at least partially soluble in hydrocarbon solvents, e.g. cyclohexane. Examples of cyclic acid anhydride compounds include the presently preferred cis or trans hexahydro-4-methylphthalic anhydride as well as maleic anhydride, succinic anhydride, glutaric anhydride, phthalic anhydride, 3-methylphthalic anhydride, 4-methylphthalic anhydride, cis-hexahydrophthalic anhydride, trans-hexahydrophthalic anhydride, cis-1,2,3,6-tetrahydrophthalic anhydride, citraconic anhydride, dl-camphoric anhydride, 3-methylglutaric anhydride, methylsuccinic anhydride, 2-dodecen-1-ylsuccinic anhydride, and the like, alone or in admixture.

Broadly, the equivalent ratio of epoxy compound to polymer-alkali metal can be from about 0.1:1 up to 5:1, preferably about 0.8:1 to 2:1. For maximum carboxy content in the polymer, the equivalent ratio of epoxy compound to polymer-alkali metal should be at least about 1:1. Equivalent ratios below about 1:1 tend to produce coupled product in the carboxy-containing polymer product. It is believed that epoxy compound in excess of the stoichiometric amount is not significantly harmful to the process in terms of the second step reaction.

The temperature employed for the reaction of the epoxy compound with polymer-alkali metal is about 30° to 200° C., preferably about 80° to 120° C. The time employed is not critical because of the speed of this reaction, dependent to some extent on the mixing efficiency, such as about 10 seconds up to 10 minutes. The pressure employed is not believed to be critical, and autogenous pressure is satisfactory. For volatile epoxy compounds, the reaction should be conducted under an inert gas such as nitrogen, helium, or argon.

In the second step, the reaction mixture is treated with the cyclic acid anhydride employing equivalent ratios of anhydride to starting polymer-alkali metal similarly as disclosed for the epoxy compound to polymer-alkali metal. The temperatures, pressures, and times employed can be the same as described above.

The polymeric solution or dispersion, after the steps described, can be conveniently handled by steam-stripping or water-coagulation techniques during which the carboxylate salt is substantially converted to the polymer carboxylic acid.

By the above method, the weight percentage of polymer produced having carboxy attached thereto can be quite high, for instance about 40 to 99 percent, more generally about 60 to 95 percent, at least about 75 percent. The weight percent polymer with carboxy end groups can be determined by separation techniques employing extraction, elution, chromatography, or the like.

Vinyl Monomer

Vinyl monomers employed in making the thermosetting compositions (compounds) in accordance with my invention are the liquid vinyl monomers, and of these preferably the monovinyl monomers.

These include styrene, vinyltoluene, divinylbenzene, 2-vinylpyridine, diallyl phthalate, triallyl isocyanurate, α-methylstyrene, alkyl acrylates and alkyl methacrylates in which the carbon atoms in the alkyl groups range from 1 to 6, and the like, and mixtures thereof. The presently preferred vinyl monomer is styrene because of its availability, reactivity, low cost, and desirable properties.

Reinforcing Agent

Reinforcing agents which can be used comprise fibers selected from among glass, asbestos, carbon, graphite, and metal fibers of synthetic polymer such as polyamides, polyesters, polyolefins, and the like, and natural fibers such as cotton, jute, hemp, sisal, flax, wood, paper, and the like. A presently preferred fiber is glass fiber. The fibers can be used in the form of mats, fabrics, threads, chopped fiber, and the like.

Proportions

The ratio of (a) unsaturated polyester to (b) carboxy-containing conjugated diene polymer generally will be in the range of about 15:1 to 0.5:1, preferably about 5:1 to 1:1, weight ratio.

The amount of vinyl monomer employed in the BMC or SMC compositions generally is in the range of about 15 to 300, preferably about 30 to 200, parts by weight vinyl monomer per 100 parts by weight total of polyester plus carboxy-diene polymer.

In compositions including a catalyst, the catalysts used are conventional free radical initiators selected from among organic peroxides and hydroperoxides, such as benzoyl peroxide, dicumyl peroxide, methyl ethyl ketone peroxide, lauroyl peroxide, cyclohexanone peroxide, t-butyl perbenzoate, t-butyl hydroperoxide, t-butylbenzene hydroperoxide, cumene hydroperoxide, t-butyl peroctoate, and the like. In addition, azo compounds such as azobis-isobutyronitrile can be employed. A presently preferred catalyst is t-butyl perbenzoate. The catalyst generally is employed in the range of about 0.1 to 10, more usually about 1 to 5, parts by weight per 100 parts by weight polyester plus carboxy-containing polymer. The amount of reinforcing agent, where employed, generally will be in the range of about 20 to 300, more usually about 40 to 200, parts by weight per 100 parts by weight polyester plus carboxy-containing polymer.

In compositions of the prior art, not including the additive in accordance with my invention, thickening agents sometimes have been utilized. If further thickening is desired, about 0.2 to 20, more usually about 2 to 10, parts by weight per 100 parts by weight of total polyester plus carboxy-containing polymer, of an oxide or hydroxide of a Group IIA or B metal can be included. Typically these include oxides and/or hydroxides of magnesium, calcium, or zinc.

Other optional additives can be employed, such as fillers, pigments, colorants, lubricants, stabilizers, silane coupling agents, and the like.

Fillers include calcium carbonate, calcium silicate, talc, clay, alumina, aluminum hydroxide, antimony trioxide, silica, mica, barium sulfate, calcium sulfate, and the like, and mixtures thereof. Presently preferred fillers include calcium carbonate, clay, and talc because of availability and cost. The quantity of filler, when used, is generally is in the range of about 50 to 1000, preferably about 150 to 800, parts by weight filler per 100 parts by weight polyester plus carboxy-polymer.

A lubricant such as aluminum, barium, calcium, magnesium, or zinc stearate, and the like, in the range of about 0.2 to 20, preferably about 1 to 15, parts by weight per 100 parts by weight carboxy-polymer plus polyester, can be used to impart mold release properties to the compositions.

A stabilizer such as a barium or cadmium soap, a tin compound such as tin octanoate, a phosphite such as tris(nonylphenyl)phosphite, alkyl phenols such as BHT, quinones, amines, and the like, can be employed in an amount ranging from about 0.02 to 5 parts by weight per 100 parts by weight polyester plus carboxy-containing polymer of a conjugated diene.

Conventional colorants and pigments such as $TiO_2$, carbon black, phthalocyanine pigments, and the like, and mixtures thereof, can be employed as desired in amounts sufficient to give the desired color to the final molded product.

Blending

The ingredients are incorporated by a milling technique which involves moderate shear. This can be accomplished by means such as twin-rotor mixers designed to give moderate shear to the paste-like ingredients. It is desirable to provide some shear and because of the viscosity of the materials being mixed, proper mixing may be difficult to obtain simply by stirring or by using a conventional impeller mixer. On the other hand, high intensity mixing which would generate excessive heat and activate the catalyst should be avoided.

Sheet molding compounding line mixing equipment also can be used. This mixing under sufficient shear to achieve good dispersion of the ingredients without heat buildup sufficient to activate the catalyst insures a good blend and is necessitated by the fact that the polymer of the conjugated diene is a normally solid material as opposed to a liquid or semi-solid. Shear which gives a heat build-up of 1 to 50, preferably 2° to 30° C., is satisfactory.

Curing

Curing can be done at a temperature known in the art for the particular catalyst utilized. Generally a temperature of 100° to 200° C. for a time of 1 to 15 minutes in a press is sufficient.

Molded compositions in accordance with my invention possess outstanding smoothness and gloss.

EXAMPLES

Examples are provided in order to assist a further understanding of my invention. Particular species employed, conditions, and the like, should be considered as exemplary and not limitative of the reasonable scope of my invention as disclosed in the specification including the Examples and claims.

The following inventive and comparative runs illustrate the preparation of compositions containing the additive in accordance with my invention, exemplified by potassium oleyl phosphate (invention), versus other surface modifiers (prior art or comparison runs).

The compositions were prepared according to the following recipe:

| Recipe | |
|---|---|
| Ingredient | Amount, g |
| Resin | 150 |
| Rubber[a]/styrene[b] | 150 |
| Calcium carbonate[c] | 450 |
| Zinc stearate | 12 |
| Magnesium hydroxide[d] | 9 |
| t-Butyl perbenzoate | (3 cc) |
| Surface modifier | var. |
| Glass fibers[e] | (200)[f] |

[a]Solprene ® 312, a solution-prepared $CO_2$-terminated carboxy-containing rubbery butadiene-styrene copolymer from Phillips Petroleum Company.
[b]Solution of the carboxy-terminated copolymer in styrene - 30 wt. % polymer based on total polymer-in-styrene solution.
[c]Camel Wite from Harry T. Campbell Sons' Company.
[d]Marinco H from Merck & Co. Inc.
[e]417X from Johns Mansville.
[f]Glass fiber - 200 g - was added to paste after 170 g of paste was removed for viscosity measurement.

The above ingredients were mixed according to the following procedure. Mixer speed of 2000 rpm in a Cowles mixer was employed for each step. The rubber/styrene solution and resin were mixed. Surface modifier, zinc stearate, calcium carbonate, t-butyl perbenzoate, and magnesium hydroxide were added in that order, with mixing after each addition. A portion (170 g) of the resulting paste was removed for viscosity measurement. The remaining paste and the glass fibers were mixed in a Baker Perkin mixer.

The pastes were cured into plaques measuring 15.2 cm×15.2 cm×0.38 cm (3 minutes at 149° C. and 7,000 pounds) or discs of 7.6 cm diameter and 0.38 cm thickness (3 minutes at 149° C. and 40,000 pounds).

Table I provides a summary of the inventive and comparative runs with variables and test results:

TABLE I

| Run # | Run Type[a] | Resin | Surface Modifier Type | Surface Modifier Amt., g | Cured Roughness[b] | Cured Gloss[c] |
|---|---|---|---|---|---|---|
| 1 | Comp. | P[d] | None | 0 | 0.6 (0.8) | 64 |
| 2 | Inv. | P | KOP[e] | 12 | ND[j] | 70 |
| 3 | Inv. | P | KOP[e] | 1.5 | 0.25 | 76 (81) |
| 4 | Inv. | P | KOP[e] | 2 | ND | 69 |
| 5 | Comp. | P | KTDP[r] | 1.5 | 0.47 | 63 |
| 6 | Comp. | P | PEP[g] | 1 | ND | 63 |
| 7 | Comp. | P | TDPA[k] | 1.5 | ND | 66 |
| 8 | Comp. | P | GTS[l] | 3 | ND | 65 |
| 9 | Comp. | P | OA[m] | 3 | ND | 66 |
| 10 | Comp. | P | KLP[n] | 1.5 | ND | 62 |
| 11 | Comp. | P | OPA[o] | 1.5 | ND | 71 |
| 12 | Comp. | P | ZEL[p] | 1.5 | 0.33 | 72 |
| 13 | Comp. | P | STDA[q] | 1.5 | ND | 65 |
| 14 | Comp. | G[i] | None | 0 | 0.7 | 42 (33) |
| 15 | Inv. | G | KOP[f] | 2 | 0.4 | 59 (55) |
| 16 | Comp. | G | PEP | 1.5 | ND | 62 |
| 17 | Inv. | R[h] | KOP[e] | 1.5 | 0.35 | 63 |
| 18 | Comp. | R | None | 0 | 0.5 (0.55) | 57 (53) |

[a]Comp. = Comparative Run; Inv. = Inventive Run.
[b]Roughness measured with Bendix Profilometer, Type QBA, with 1 inch stroke. Values in parentheses are duplicate determinations.
[c]Gloss measured on Gardner Gloss Meter. Values in parentheses are duplicate determinations.
[d]Resin is Paraplex P-340 polyester resin from Rohm and Haas.
[e]KOP is potassium oleyl phosphate mixture from Proctor Chemical of about 2 parts $C_{18}H_{35}OP(O)(OH)(OK)$ and 1 part $(C_{18}H_{35}O)_2P(O)(OK)$ with approximately 15 weight percent isopropanol based on the total commercial composition.
[f]Potassium oleyl phosphate made by titrating oleyl phosphate from Proctor Chemical with aqueous methanolic KOH. Composition is 2/1 molar ratio of ROPO(OK)₂/(RO)₂PO(OK).
[g]PEP-100 is a commercial proprietary material from Air Products and Chemicals, Inc., believed to be a transition metal salt adsorbed on a substrate.
[h]Resin is RS50239, an unsaturated polyester of the isophthalate type, from PPG Industries.
[i]Resin is 13031, an unsaturated polyester of the isophthalate type, from Grace Chemical Co.
[j]ND means "Not Determined".
[k]TDPA is tridecylphosphoric acid (2/1 molar ratio of $ROP(O)(OH)_2$ and $(RO)_2P(O)(OH)$).
[l]GTS is glycerol tristearate.
[m]OA is oleic acid.
[n]KLP is potassium lauryl phosphate.
[o]OPA is oleyl phosphoric acid.
[p]ZEL is Zelec UN, a dilauryl phosphite from DuPont.
[q]STDA is sodium tridecylphosphate prepared by neutralization of tridecylphosphoric acid with aqueous methanolic NaOH; 2/1 mole ratio of $ROP(O)(OH)(ONa)$ and $(RO)_2P(O)(ONa)$.
[r]KTDP is potassium tridecyl phosphate prepared by neutralization of tridecylphosphoric acid with aqueous methanolic KOH; 2/1 mole ratio of $ROP(O)(OH)(OK)$ and $(RO)_2P(O)(OK)$.

The data in Table I illustrate the effectiveness of the present invention in improving the surface gloss of molded objects of the unsaturated polyester compositions. In the series of Runs 1 to 13 only oleyl phosphoric acid and Zelec UN, a commercial gloss improver, approached the inventive potassium oleyl phosphate in surface gloss. It is noteworthy that the use of saturated salts, potassium tridecylphosphate, sodium tridecylphosphate, and potassium lauryl phosphate (Runs 5, 13, and 10, respectively) resulted in significantly lower gloss than inventive compositions in Runs 2–4. Runs 14–15 and 17–18 demonstrate the improvement in gloss resulting from use of potassium oleyl phosphate in compositions based on other commercial unsaturated polyester resins. The inventive compositions also exhibited higher viscosity in the paste form before molding than the comparative compositions.

The disclosure, including data, has illustrated the value and effectiveness of my invention. The examples, the knowledge and background of the field of the invention and the general principles of chemistry and of other applicable sciences have formed the bases from which the broad descriptions of my invention including the ranges of conditions and the generic groups of operant components have been developed, and formed the bases for my claims here appended.

I claim:

1. A thermosetting composition comprising:
   (a) an unsaturated polyester,
   (b) a solid carboxy-containing rubbery diene polymer,
   (c) a vinyl monomer, and
   (d) a potassium unsaturated-hydrocarbyl orthophosphate ester.

2. A curable thermosetting composition comprising the composition as defined by claim 1 further including a free radical catalyst.

3. A cured thermosetting composition comprising the cured composition of claim 2.

4. An article or sheet made from a cured thermosetting composition as described by claim 3.

5. A composition as defined by claim 1 further including at least one of a reinforcing agent and a filler.

6. The composition as defined by claim 5 further including a lubricant, stabilizer, and colorant.

7. The composition of claim 1 as a bulk molding compound.

8. The composition of claim 1 as a sheet molding compound.

9. The composition of claim 1 wherein said (a) unsaturated polyester is the esterification polymer product of an unsaturated dicarboxylic acid of 4 to 12 carbon atoms;

said (b) carboxy-containing rubbery diene polymer is a polymer of a conjugated diene of 4 to 12 carbon atoms or copolymer thereof with a liquid vinyl monomer of 8 to 18 carbon atoms; and said (c) vinyl monomer is selected from the group consisting of styrene, vinyltoluene, divinylbenzene, 2-vinylpyridine, diallyl phthalate, triallyl isocyanurate, α-methylstyrene, alkyl acrylates and alkyl methacrylates in which in the alkyl groups contain 1 to 6 carbon atoms, and mixtures thereof.

10. The composition of claim 9 wherein said (d) potassium unsaturated-hydrocarbyl orthophosphate is represented by:

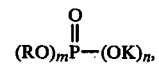

wherein each R is hydrogen or an unsaturated hydrocarbyl radical, such that at least one R must be the aforesaid unsaturated hydrocarbyl radical; m is an integer and is 1 or 2; n is an integer and is 1 or 2; m plus n is 3; and K is potassium.

11. The composition of claim 10 wherein said (d) potassium unsaturated-hydrocarbyl orthophosphate is potassium hydrogen oleyl phosphate, dipotassium oleyl phosphate, potassium dioleyl phosphate, or mixtures.

12. The composition of claim 11 wherein said (c) vinyl monomer is a monovinyl monomer, employing a ratio of: a:b of about 15:1 to 0.5:1 weight ratio; (c) monovinyl monomer in the proportion of about 15 to 300 parts by weight per 100 parts total (a)+(b).

13. The composition of claim 12 wherein said (b) carboxy-containing polymer is an epoxy/cyclic anhydride terminated carboxy-containing diene polymer, and said (c) is styrene.

14. The composition of claim 12 wherein said (b) carboxy-containing diene polymer is a $CO_2$-terminated carboxy-containing diene polymer.

15. The composition of claim 14 wherein said vinyl monomer is styrene, and said potassium unsaturated-hydrocarbyl orthophosphate is potassium oleyl phosphate.

16. A cured composition of claim 9.

17. A cured composition of claim 15.

* * * * *